UNITED STATES PATENT OFFICE.

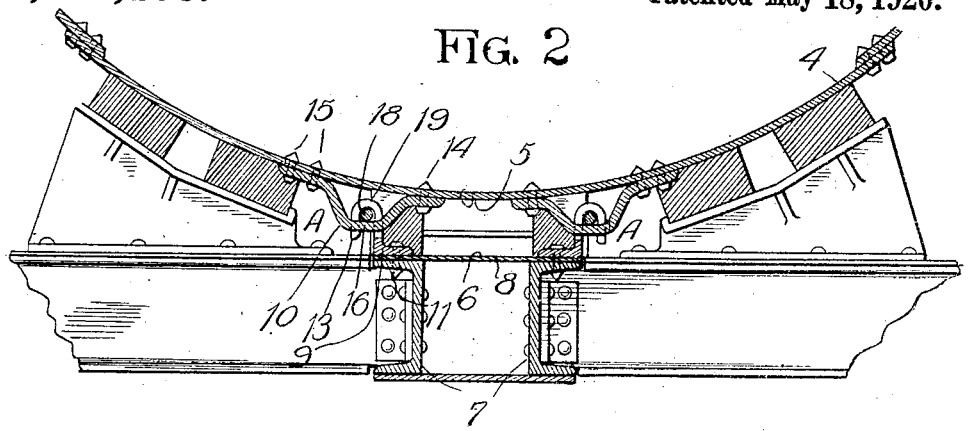
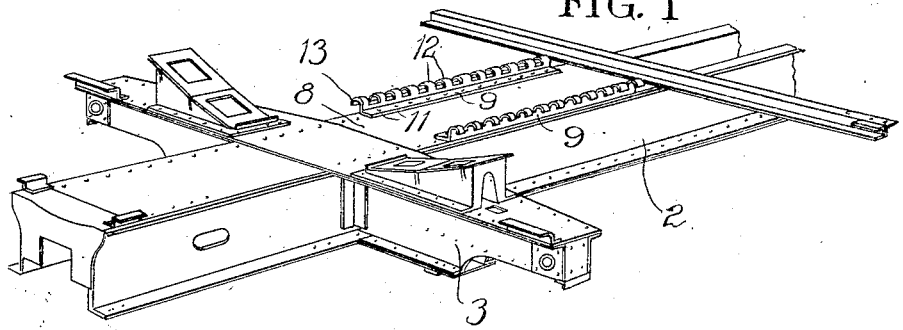
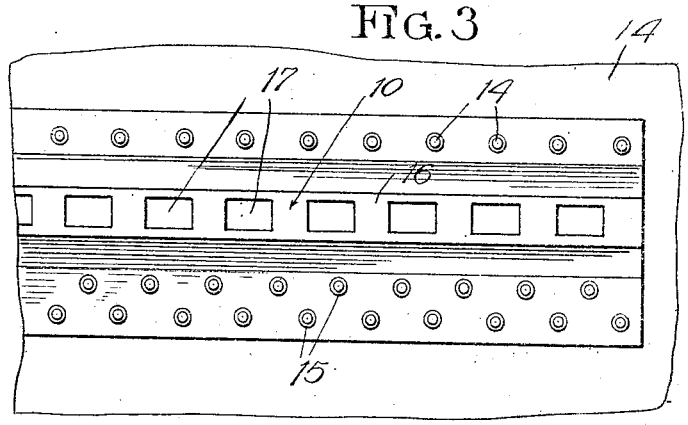

WILLIAM J. TANGERMAN, OF HAMMOND, INDIANA.

TANK-CAR ANCHORAGE.

1,340,188.  Specification of Letters Patent.  Patented May 18, 1920.

Application filed November 23, 1919. Serial No. 341,001.

*To all whom it may concern:*

Be it known that I, WILLIAM J. TANGERMAN, a citizen of the United States, and residing at Hammond, Lake county, Indiana, have invented certain new and useful Improvements in Tank - Car Anchorages, of which the following is a specification.

My invention relates generally, to railroad tank cars, but relates more particularly to those provided with an underframe and cradles upon which the tank is supported.

The invention is by way of an improvement of the general structure shown in my Patent No. 1,261,182 of April 2, 1918. In cars of this class the underframe is of greater length than the tank and is relied upon to absorb the shocks, stresses and other forces which are incident to the operation of the car. Tank cars are frequently used with contents the characteristics of which are such as to require heat to facilitate unloading, and as a result of the application of heat to the tank, expansion and contraction occurs and it is necessary, therefore, to provide means securing the tank to the underframe in such a way as to admit of a relative movement of the car parts. My invention relates to a construction of this character, commonly referred to as anchorages. While the anchorage permits relative, longitudinal movement it is of such character as to prevent complete shifting of the tank. Thus the tank is free to expand and contract on the under frame.

An anchorage in position is subjected to tremendous strains which tend to tear it apart from the car under frame. There is also danger under certain conditions, unless restrained, of the tank jumping from the under frame.

The object of my invention is to overcome these difficulties and more particularly to provide a tank car anchorage which shall have a greatly increased bearing surface thereby better adapting it to withstand the tremendous strains to which it is subjected in use.

It is also an object of my invention to provide means for locking the tank in place, which means shall be of such construction as to be readily detachable to permit the free lifting of the tank from the car without disturbing those anchorage fastenings which are riveted or otherwise permanently secured to the tank and car frame parts.

I aim also to produce a car anchorage which shall be simple in construction, durable in operation and which can be attended to by ordinary workmen.

My invention consists generally in the form, arrangement, construction, and coöperation of the parts whereby the above named objects, together with others which will appear hereinafter, are attainable; and my invention will be more readily understood by reference to the accompanying drawings which illustrate what I consider at the present time, to be the preferred embodiment thereof.

In said drawings:

Figure 1 is a perspective view of one end portion of a car under frame on which part of a car anchorage embodying my invention is shown.

Fig. 2, is an enlarged transverse sectional view illustrating the tank locked in place by the tank car anchorage embodying my invention; and Fig. 3, is a bottom view of a portion of the tank showing part of the tank car anchorage.

2, represents the car center sill; 3 the bolster cradle (of which there are two, one at the other end of the car not shown), and 4, the car tank.

The cradles of the under frame are preferably so designed that the bottom 5, of the tank is spaced several inches above the top 6, of the under frame.

My tank car anchorage is placed between the top 6, of the car sill and the bottom 5 of the tank. As shown it is arranged near one of the car bolsters 3.

The car center sill may be constructed in various ways but as shown, it is composed of spaced channel members 7 and the channel members 7 are provided with a cover plate 8. The car anchorages as here shown are positioned substantially over the flanges of the channel members 7 and while the position of these anchorages may be varied, both transversely and longitudinally, I prefer to mount them as shown, *i. e.*, over the flanges of the channel members and terminating adjacent one of the body bolsters 3. The anchorage may be varied in length the size thereof being determined by the size of the tank and the thickness and proportions of the metal parts. It will be noted that there are two of the tank car anchorages, one on each side of the center sill and arranged in parallel relation.

The tank car anchorage as a whole is given the reference character A. Each tank car anchorage is composed of two complementary members 9 and 10. The lower member 9 is preferably an angle bar having its lower flange attached to the channel of the under frame by a plurality of rivets 11, which rivets, it will be noted, also pass through the cover plate 8. The vertical flange of the member 9 is cut away to form the portions 12, and the vertical flange is bent back as indicated at 13 thus forming a plurality of U-shaped portions.

The upper member 10 of the anchorage A is a channel or trough, preferably formed of sheet metal and having edge portions which are attached to the bottom of the tank 4 by means of rows of rivets. As here shown a single row of rivets 14 is used at the inner edge of the trough and two rows of rivets 15 at the outer edge. The sides of the trough member preferably converge as shown and are connected by the bottom portion 16, which bottom portion is provided with a plurality of slots 17 arranged in a row. The size of these slots is such as nicely to accommodate or admit the U-shaped teeth like portions of the member 9, which teeth-like portions extend upwardly into the slot 17 as is probably best shown in Fig. 1. When the tank and car under frame are in the position shown in Fig. 1 the U-shaped teeth portions of the member 9 present double edges to each end of the corresponding slots 17. Therefore, when the car is subjected to endwise shock the force is communicated to the tank through the medium of and the shifting of the tank is prevented by the intermeshing upper and lower anchorages, and because of this double edge engagement a very large bearing surface is presented so that all danger of shearing is avoided.

The slots between the teeth-like portions of member 9, it should be stated, are of a depth such as will permit the tank to settle on the saddle blocks (as they are worn down in use) thus preventing the anchorage from supporting the tank even after a long period of usage. Thus a permanently flexible construction is provided which greatly increases the life of the car.

I have thus far described the anchorage construction on one side of the car but it will be understood that the parallel anchorage upon the other side is of similar construction, and, therefore, the description already given as to one will serve for both. These parallel anchorages, of course, both act to prevent longitudinal movement and naturally they also prevent any rotation of the tank upon the under frame.

As heretofore stated it may be desired at times to lift the tank off the under frame and this may be done without disturbing any of the fixed parts 9 or 10 of the car anchorage. Since the complementary members of the anchorage are engaged through the medium of the U-shaped teeth, the tank may be either removed or lowered into position without disturbing said riveted parts. When the tank is in place, however, the force of any shock is distributed uniformly throughout the length of the anchorage and the latter is relieved from vertical strains which would tend to bend the ends of the complementary parts.

The important feature of a short bending arm, due to the engagement of the anchorage parts 9 and 10 substantially midway between the car sill and the tank, as first disclosed in my patent heretofore mentioned, is retained in this construction.

For some reasons and under certain conditions it is desirable to lock the tank and the under frame against vertical separation. This, I am enabled to do in a very simple and convenient manner by placing a rod 18 longitudinally of the anchorage just over the lower wall 16 of the anchor member 10 and in a position inclosed by the U-shaped teeth of the lower member 9. The rod 18 is slightly smaller than the space defined by these parts so that a certain amount of vertical movement is permitted, thereby relieving these parts from the imposition of strains in the ordinary operation of the car. If, for any reason, abnormal forces should be subjected to the car tending to the vertical separation of the under frame and tank, the member 9 would force the rod 18 against the extreme upper portion 19 of the U-shaped teeth of the lower anchorage member 9, at which time a further movement would be absolutely restrained by the rod 18. Since the rod extends longitudinally throughout the length of the anchorage and engages all of the U-shaped teeth members it serves to resist tremendous strains since the parts could only be separated by shearing of the rivets or other parts comprising the tank car anchorage. Nuts are provided at the ends of the rods 18 to prevent accidental removal of the rods.

When, for any reason, it is desired to lift the tank off the under frame all that is necessary is to remove rods 18 which can be done by a mere pull thereon since, as before stated, the rods 17 are slightly smaller than the space in which they are confined. With this construction a tank car anchorage is provided in which the parts (tank and under frame) are actually locked against abnormal vertical separating movement, while ordinary or limited movement is not interfered with, and the lock is also of such simple construction that interlocking can be accomplished with very little effort.

As certain modifications of my invention will suggest themselves to those skilled in the art to which this appertains, I do not wish to be limited to the specific construction and arrangement shown and described except only as may be necessary by limitations in the hereunto appended claims.

I claim:

1. A tank car anchorage embodying therein a trough-shaped member containing a longitudinal row of perforations, and a complementary bar having a row of rectangular teeth, the upper portions of which are folded down and which are positioned in said perforations.

2. A tank car anchorage embodying therein a trough-shaped member containing a longitudinal row of perforations, and a complementary bar having a row of rectangular teeth, the upper portions of which are folded down and which are positioned in said perforations, and means for locking the complementary members against undesired separation.

3. A tank car anchorage embodying therein a trough-shaped member containing a longitudinal row of perforations and a complementary bar having a row of teeth, the end portions of which are folded back and which are positioned in said perforations.

4. A tank car anchorage embodying therein a trough-shaped member containing a longitudinal row of perforations and a complementary bar having a row of teeth, the end portions of which are folded back and which are positioned in said perforations, and means for locking the complementary members against undesired separation.

In testimony whereof I have hereunto set my hand, this 7th day of November, 1919.

WILLIAM J. TANGERMAN.